(57.)

GEORGE R. BURT.
Improvement in Apparatus for Expressing the Juice from Apples and other fruit.

No. 122,878.  Patented Jan. 23, 1872.

2 Sheets--Sheet 1.

Witnesses:  
George R. Burt, Inventor

GEORGE R. BURT.
Improvement in Apparatus for Expressing the Juice from Apples and other fruit.
No. 122,878.   Patented Jan. 23, 1872.

Witnesses:
George R. Burt, Inventor.

UNITED STATES PATENT OFFICE.

GEORGE R. BURT, OF PERRY, NEW YORK.

IMPROVEMENT IN APPARATUS FOR EXPRESSING THE JUICE FROM APPLES, &c.

Specification forming part of Letters Patent No. 122,878, dated January 23, 1872.

*To all whom it may concern:*

Be it known that I, GEORGE R. BURT, of Perry, in the county of Wyoming and State of New York, have invented an Improved Apparatus for Expressing the Juice from Apples and other Fruit; and I do hereby declare that the following is a full and exact description thereof, reference being had to the accompanying drawing which forms a portion of this specification.

Figure 1:
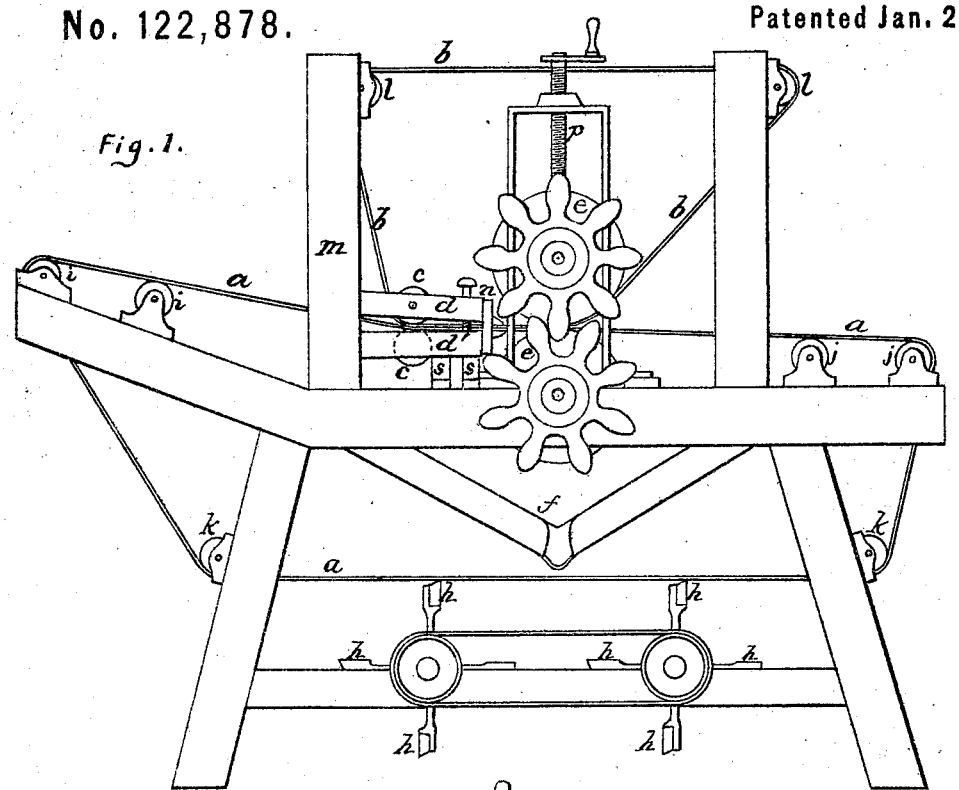
Figure 2:
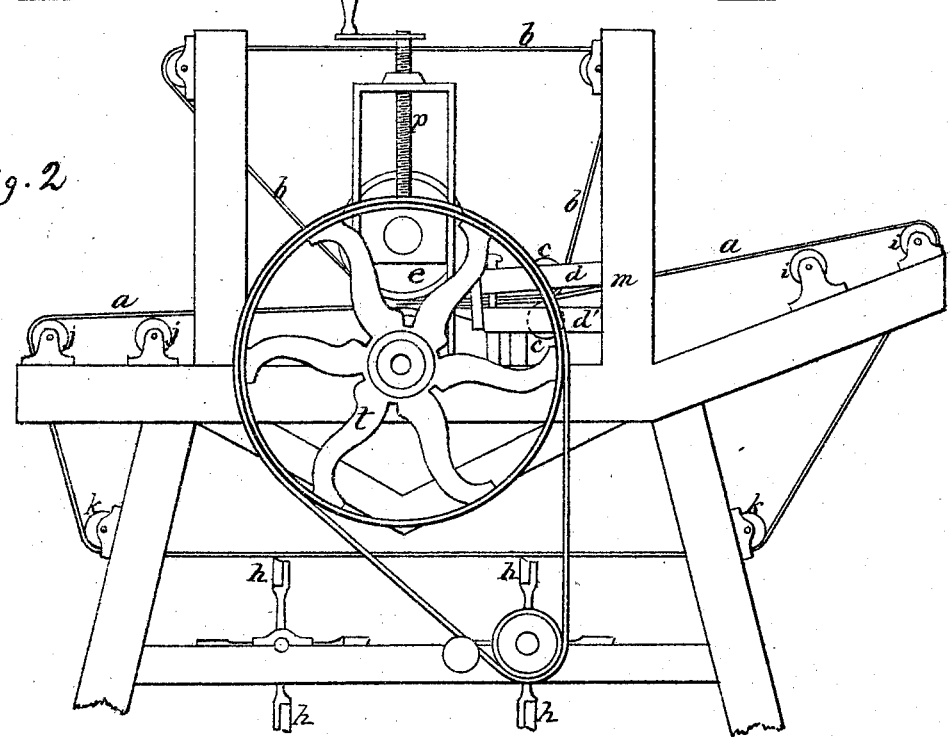
Figure 3:
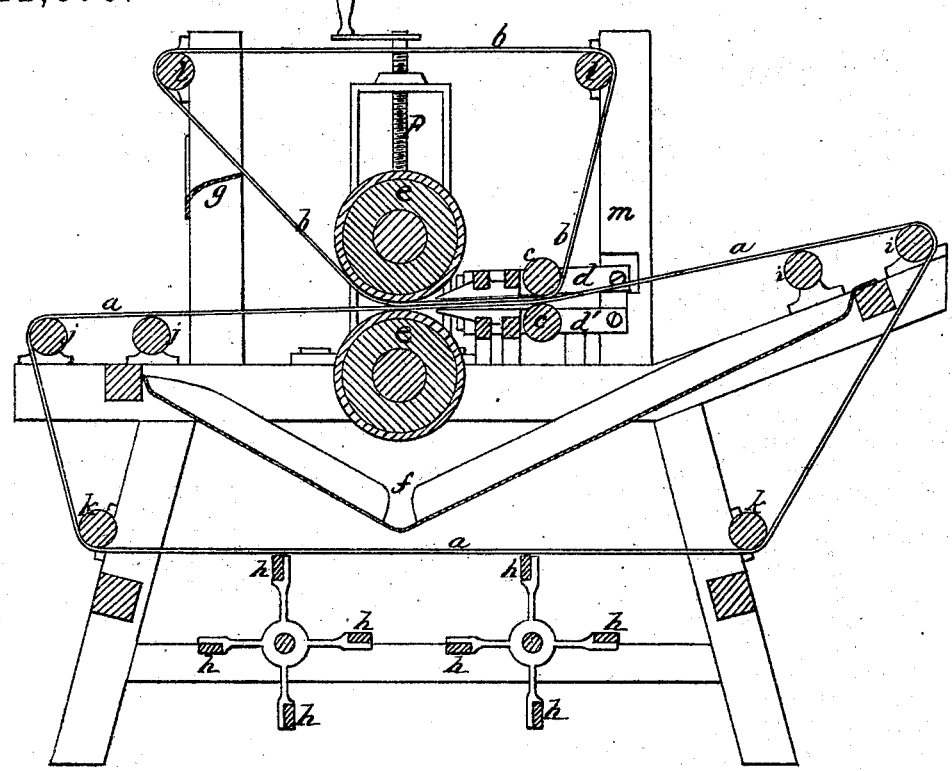
Figure 4:
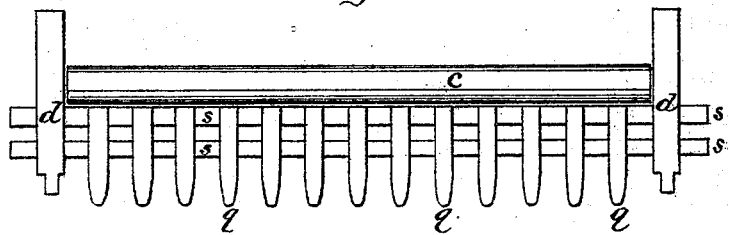

Figures 1 and 2 of the drawing are views of opposite sides of said apparatus; Fig. 3, a vertical longitudinal section of the same; and Fig. 4, a view of a portion of the apparatus detached.

Similar letters indicate like parts in each of the drawings.

The supporting frame-work of my improved apparatus for expressing the juice from apples, &c., may be constructed in the manner represented in the drawing, or any other that may be preferred. The operating parts of said apparatus are the endless carrying-apron $a$, the auxiliary apron $b$, the preliminary pressure-rollers $c\ c$, the distributing-racks $d\ a'\ q\ s$, the main compressing-rollers $e\ e$, the receiving and discharging concave $f$, the shaper $g$, Fig. 3, and the revolving beating, scraping, and cleansing slats $h\ h$, all arranged and operating with each other in the manner shown in the drawing and hereinafter set forth. The endless carrying-apron $a$ is received between the preliminary pressure-rollers $c\ c$, the distributing-racks $d\ d'\ q\ s$, and the main pressure-rollers $e\ e$, and thence passes over the supporting-rollers $i\ i$ and $j\ j$, and under the tightening-rollers $k\ k$, which are all respectively located in the positions shown in the drawing. The frame-supports of the rollers $i\ i$ are inclined outwardly upward, for the purpose of giving the desired degree of inward inclination to that portion of the carrying-apron that receives the prepared fruit and carries the same forward into the machine, to be acted upon by the pressure-rollers. The endless auxiliary apron $b$, which is placed above the carrying-apron $a$, is also received between the preliminary pressure-rollers $c\ c$, the distributing-racks $d\ d'\ q\ s$, and the compressing-rollers $e\ e$, and thence rises and passes over the supporting and tightening rollers $l\ l$. The journals of the preliminary pressure-rollers $c\ c$ are received into bearings in the heads $d\ d'$ of the distributing-racks. The outer ends of the heads $d\ d'$ of the distributing-racks are pivoted to the uprights $m$ of the supporting-frame of the apparatus, and the inner ends of said rack-heads are connected to each other by elastic bands $n$, as shown in Fig. 1. The peripheries of the main compressing-rollers $e\ e$ may be coated with any desired thickness of vulcanized rubber. The distance of said rollers from each other may be regulated and adjusted by the set-screws $p$ acting upon the journal-box of the upper roller. The fingers $q\ q$ of the respective distributing-racks, Fig. 4, may be placed at any desired distance from each other, and may be combined with their respective supporting-bars $s\ s$ in any suitable manner. The journals of the shafts of the respective series of scraping and beating, revolving, cleansing-slats $h\ h$ work in suitable bearings combined with the frame-work of the apparatus, and are connected with each other by means of a band and pulleys, as shown in Fig. 1. The main-driving-pulley $t$, on the shaft of the lower compressing-roller $e$, is banded to a pulley on one of the shafts of the revolving cleansing-slats $h\ h$, as shown in Fig. 2. Power may be applied to the respective operating parts of the apparatus by means of a band passing from a driving-drum onto the pulley $t$ on the shaft of the lower compressing-roller $e$, or by any other means that may be preferred. The revolving slats $h\ h$ remove the pomace and crushed fruit from the endless apron $a$ by the combined action of scraping and beating; and should it be deemed expedient, said slats may be rotated at a sufficiently high velocity to supplement their cleansing action upon the carrying-apron by causing strong currents of air to impinge upon the same. It is indispensably necessary that the interstices of the carrying-apron should be kept sufficiently clear to allow the juice of the fruit that may be expressed by the rollers of the appparatus to pass freely through said apron. In practice, should it be found that one bearing-shaft of revolving cleansing beaters $h\ h$ will be amply sufficient for keeping the carrying-apron in a proper operative condition, the other rotating shaft of cleansing-beaters may be dispensed with. A stationary scraper, $g$, Fig. 3, will keep the auxiliary apron $b$ in a proper operative condition.

The apparatus having been put in motion, the properly prepared fruit is fed upon the carrying-apron $a$, and is first carried under the auxiliary apron $b$, and between the preliminary pressure-rollers $c$ $c$ to the distributing-racks $d$ $q$ $s$, which serve to equalize the layer of partially-compressed fruit between the two aprons $a$ $b$, before it reaches the main compressing-rollers $e$ $e$, which rollers remove all the remaining juice from the fruit, and then the continuous movements of the respective parts of the apparatus causes the juice-expressed debris of the fruit to be discharged from the apparatus, and the freshly-prepared fruit, as it is continuously fed into the same, will have its juice expressed, and then in like manner the debris thereof will be discharged from the apparatus, the juice being received into and discharged from the concave $f$, while at the same time the scraper $g$ and the rotating cleaning-slats $h$ $h$ will keep the aprons $a$ and $b$ in proper operative condition. The compressing-rollers $e$ $e$ are connected with each other by means of long-toothed gearing-wheels, as shown in Fig. 1.

I claim as my invention—

1. The combination of the carrying-apron $a$ and the auxiliary apron $b$ with the preliminary pressure-rollers $c$ $c$ and the distributing-racks $d$ $d'$ $q$ $s$, substantially as and for the purpose herein set forth.

2. The combination of the distributing-racks $d$ $d'$ $q$ $s$ with the preliminary pressure-rollers $c$ $c$, and the compressing-rollers $e$ $e$, substantially as and for the purpose herein set forth.

3. The combination of the series of rotating cleansing slats $h$ $h$ with the carrying-apron $a$, the preliminary pressure-rollers $c$ $c$, and the distributing-racks $d$ $d'$ $q$ $s$, substantially as and for the purpose herein set forth.

4. The combination of the carrying-apron $a$ and the auxiliary apron $b$ with the preliminary pressure-rollers $c$ $c$, the compressing-rollers $e$ $e$, and the rotating cleansing-slats $h$, substantially as and for the purpose herein set forth.

In testimony that the aforegoing is a full and exact description of my improved apparatus for expressing the juice from apples and other fruit, I hereby subscribe my name this 10th day of November, 1871.

GEORGE R. BURT.

Witnesses:
   Z. C. ROBBINS,
   D. H. CLARK.